April 9, 1957     C. HANSEN     2,787,861
CRAB TRAP
Filed Feb. 8, 1955
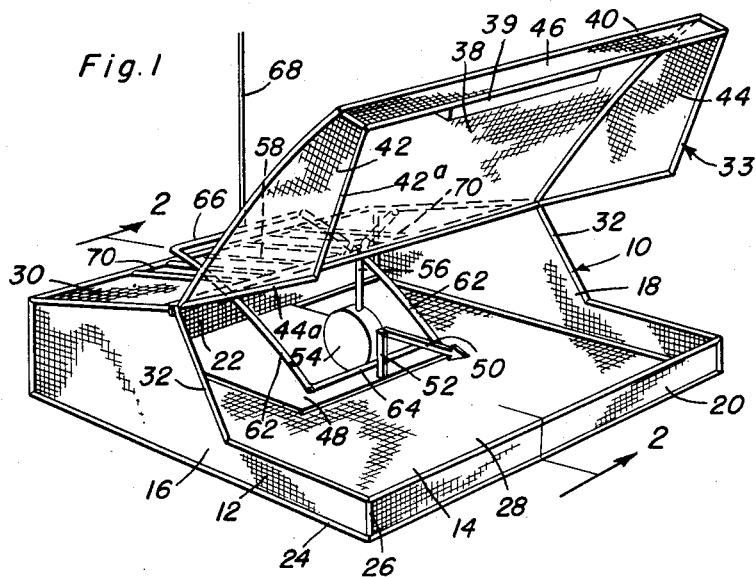
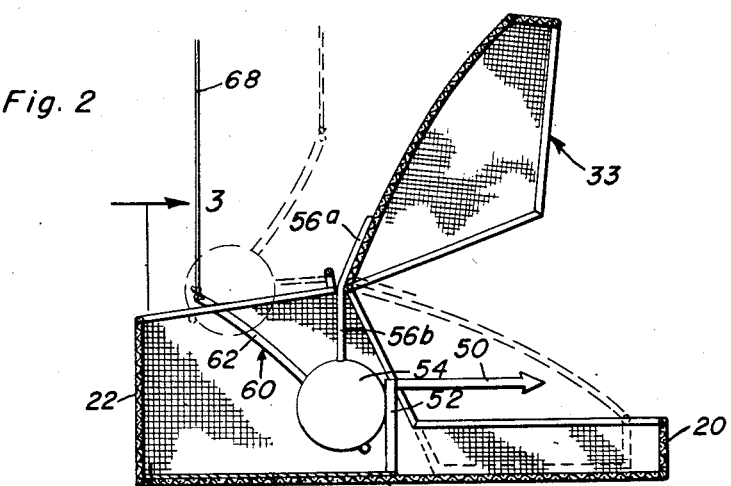
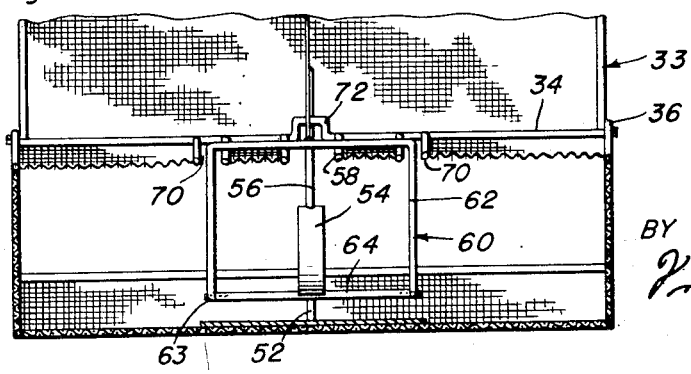
Carl Hansen
INVENTOR
BY
*Frank C. Meley*
AGENT United States Patent Office 2,787,861
Patented Apr. 9, 1957

2,787,861
CRAB TRAP
Carl Hansen, Long Island, N. Y.
Application February 8, 1955, Serial No. 486,785
9 Claims. (Cl. 43—102)

This invention relates to improvements in devices designed to catch any animal which habitually lives in the water and is particularly directed to a novel crab trap, which can catch and land a large number of crabs in a single operation.

The primary object of this invention is to provide a trap which includes a body portion having a large opening which is closed off by a lid that is hinged to the body portion, the material of the body portion and lid being such that water may freely pass therethrough while crabs and other fishes are unable to do so and the body portion having a bottom which will sit on the bottom of a body of water and the body portion and bottom thereof being so constructed as to position the body portion in an upright position with the opening being upwardly disposed and unencumbered.

A further primary object of this invention is to provide weight means and float means for moving the lid to an open position and for retaining the lid in an open position, while the trap is positioned at rest in the water and to provide means for lowering and raising the trap into and out of the water, such latter means being cooperatively associated with the weight means to overcome the effect of the same to close the lid when lifting the trap out of the water.

Another important object of this invention is to provide bait holding means in the body portion and to provide a stop for limiting the opening movement of the lid under the action of the weight and to provide a sure interfit between the lid and body portion so as to securely close off the opening.

A further important object of this invention is to provide a frame which attaches a lowering and lifting flexible element to the body portion and which is slidably associated with the body portion and connected to the weight to move the weight into lid closing position when the element is pulled upwardly.

These and ancillary objects are attained by this invention, the preferred embodiment of which is set forth in the following description and illustrated in the attached drawing, wherein;

Fig. 1 is a perspective view of the novel trap, showing the lid in an open position;

Fig. 2 is a longitudinal, vertical sectional view taken on the line 2—2 of Fig. 1; and Fig. 3 is a cross-sectional vertical view, taken on line 3—3 of Fig. 2.

Referring now more particularly to the drawing, the trap 10 is primarily designed for use in a body of water to catch a number of crabs or other water inhabiting animals, at one time. The trap includes a body portion 12 which is formed from any suitable water porous and sturdy material, such as a fine mesh wire. The body portion includes a flat bottom 14 which is designed to seat on the bottom or bed of a body of water, and upstanding sides 16 and 18, and upstanding front and rear walls 20 and 22, respectively. The bottom wall has its edges reinforced by a rectangular wire frame 24 which is suitably attached thereto and to the lower edges of the sides and front and rear walls. The front wall and the forward ends of the sides extend only slightly above the bottom wall and terminate in the same horizontal plane above the bottom wall. Such upper edges are reinforced by a wire or similar element 26. The upper edges of the sides and front wall define the front portion of the opening 28. The rear wall 22 of the body portion extends more than double the height of the front wall and parallel such wall.

At the upper reinforced edge of the rear wall, a top wall 30 is provided and the top wall is inclined upwardly and forwardly from the back wall and is secured by reinforcing elements, at its sides, to the sloped upper end edges of the rear parts of the sides 16 and 18. The intermediate parts of the sides have downwardly inclined upper edges 32 which join with the upper end edges of the front parts of the sides and the forward edge of the top wall 30 to define the rear part of the opening 28.

A lid 33 is hingedly attached by a rod 34 at the forward ends of the upper edges of the rear parts of the sides, the rod 34 forming the back edge of the lid and having its ends rotatably journalled in eyes 36 which are positioned at the juncture of the sloped upper edges 32 of the intermediate parts and the sloped upper end edges of the rear parts of the sides 16 and 18. The lid includes a top wall 38 which is carried by an open, substantially rectangular frame 40 having curved side portions and carrying the mesh type wall, which is formed from the same material as the body portion. The top wall of the lid has depending quadrilateral sides 42 and 44 and a straight rectangular front wall 46, such sides being reinforced at their free edges by frame elements. The sides 42 and 44 of the lid are similar to the intermediate and front parts of the sides of the body portion with the edge 42ª of the sides of the lid seating on the bottom wall and the edge 44ª of the sides of the lid fitting inwardly of the sloped intermediate side edges 32 of the body portion sides. The front wall 46 fits inside the front wall 20 and is of the same height. The lid, when in its closed position (shown in dotted lines in Fig. 2) completely closes off the opening and prevents fish in the body portion from escaping.

The bottom wall is provided at its rear end with a flat plate 48 which is suitably superimposed thereon and which provides an imperforate bottom wall section to prevent weeds and the like from protruding through the bottom wall at such point.

An arm 52 upstands from the forward top surface of the plate and provides a stop to limit the opening movement of the lid. The stop also supports a bait holder 50, which extends horizontally forwardly from the upper end of the arm 52. The lid carries a weight 54 which is secured thereto by a connector 56, the latter being bent and being movable through a reinforced opening 58 in the top wall. The weight is suspended from the lid by the connector which has its outer end 56ª fixed to the lid and its inner end 56ᵇ attached to the weight. The weight is adapted to be arrested by the stop 52, as shown in Fig. 2.

The weight is also carried by an open, rectangular frame 60, which has slightly bowed sides 62 and inner and outer cross bars 64 and 66, respectively, the bar 64 being pivoted at its ends to the sides 62, as shown in Fig. 3, the inner ends of the sides 62 carry pivot pins 63 which extend laterally inwardly from the sides and which are journalled axially in the opposing ends of the cross bar 64 so that the cross bar is free to rotate on the ends of the pivot pins but is held thereby in a transverse position between the sides 62. The weight 54 is fixed at a position on its circumferential edge to the inner cross bar by any suitable means, as by adhesive, welding or the like. The weight is fixed on the cross bar so as to be disposed between the sides and held in a fixed position between and parallel with the sides. The inner cross bar 64 carries the weight, while the outer cross bar carries a flexible element 68. The sides of the frame move in reinforced slots 70 in the top wall and the frame exerts a pull on the trap by reason of the arresting of the inner cross bar 64 against the inside of the top wall. A reinforced slot 58 is formed in the top wall to accommodate the connector 56 and the weight when the frame 60 is raised and a U-shaped stop 72 overlies the slot to arrest the connector 56.

A float 39, in the form of a strip of balsa wood or the like buoyant material, is attached to the top wall 38 of the lid. The float acts as a buoy and assists the weight in opening the lid, whereby the weight can be materially reduced.

In operation, the trap is lowered into the water by the flexible element 68, which may be a rope or similar member, and the inner cross bar 64 bears against the underside of the top wall 30, with the weight moved outwardly through the reinforced slot 58 in the top wall and the lid closed, as shown in dotted lines in Fig. 2. When the bottom wall of the trap seats on the bottom of the body of water, the load of the trap is released from the line 68, which is slackened to allow the weight to move downwardly, pulling the frame down and swinging the lid to its open position, the float 39 aiding the weight in opening the lid. The movement of the weight, and consequently of the lid, is arrested by the stop 52. The bait, previously impaled on the bait holder, attracts the fish which converge in the trap around it. The line is then pulled to close the lid and raise the trap with the fish caught therein.

While the best known form of my invention has been shown and described, other forms may be realized as coming within the scope of the invention, as defined by the appended claims.

I claim:

1. A crab trap comprising a porous body portion having a bottom wall, upstanding side walls and a top wall, said top wall having an opening, a lid for closing off the opening, means hingedly attaching the lid to the top wall for vertical swinging movement of the lid to open and closed positions, a weight depending from the lid adjacent its hinged attachment to the top wall, said top wall having a slot through which the weight can vertically swing, said weight in its lowered position swinging the lid to an open position, means movable through the top wall and carrying the weight and adapted to be attached to a line whereby a pull on the line will move such means outwardly and move the weight upwardly to lower the lid into a closed position.

2. A trap of the type described comprising a body portion having an opening, a lid hinged to the body portion to close off the opening, a weight carried by the lid for holding it in the open position, a member movably mounted through the body portion for upward and downward movement relative thereto, said member having an abutment portion engageable with the body portion to limit the upward movement of the member, said member being attached to the weight so that the weight is moved to close the lid when the member is moved upwardly and a flexible element attached to the member to close the lid and to raise and lower the trap.

3. A trap as claimed in claim 2, wherein said body portion has a top wall provided with an aperture through which the member extends, said top wall also having a slot, an arm secured to the lid adjacent its point of attachment to the body portion and extending through the slot into the interior of the body portion beyond the hinged point of attachment of the lid to the body portion, said weight being secured to the arm and the weight and the arm being movable through the slot when the lid is closed.

4. A trap as claimed in claim 3, wherein said member is in the form of an open rectangular frame with the inner end forming the abutment portion.

5. A trap as claimed in claim 3, wherein a stop is disposed in the body portion to arrest the weight and limit the extent of opening of the lid.

6. A trap as claimed in claim 3, wherein said body portion and lid are formed from a porous material to permit water to flow therethrough.

7. A trap as claimed in claim 3, wherein a float is carried by the lid to assist the weight in swinging the lid to an open position.

8. A trap as claimed in claim 3, wherein said body portion is formed of mesh material and includes a bottom wall having an imperforate section underlying the member and weight to prevent weeds and the like from coming in contact therewith.

9. A trap as claimed in claim 8, wherein a stop upstands from the bottom wall and engages the weight to limit the opening movement of the lid and a bait holder is carried by the stop.

References Cited in the file of this patent

UNITED STATES PATENTS

| 885,402 | Thiaville | Apr. 21, 1908 |
| 2,584,643 | Vander Clute | Feb. 5, 1952 |
| 2,639,540 | Buford | May 26, 1953 |

FOREIGN PATENTS

| 24,348 | France | 1922 |